Figure 1:
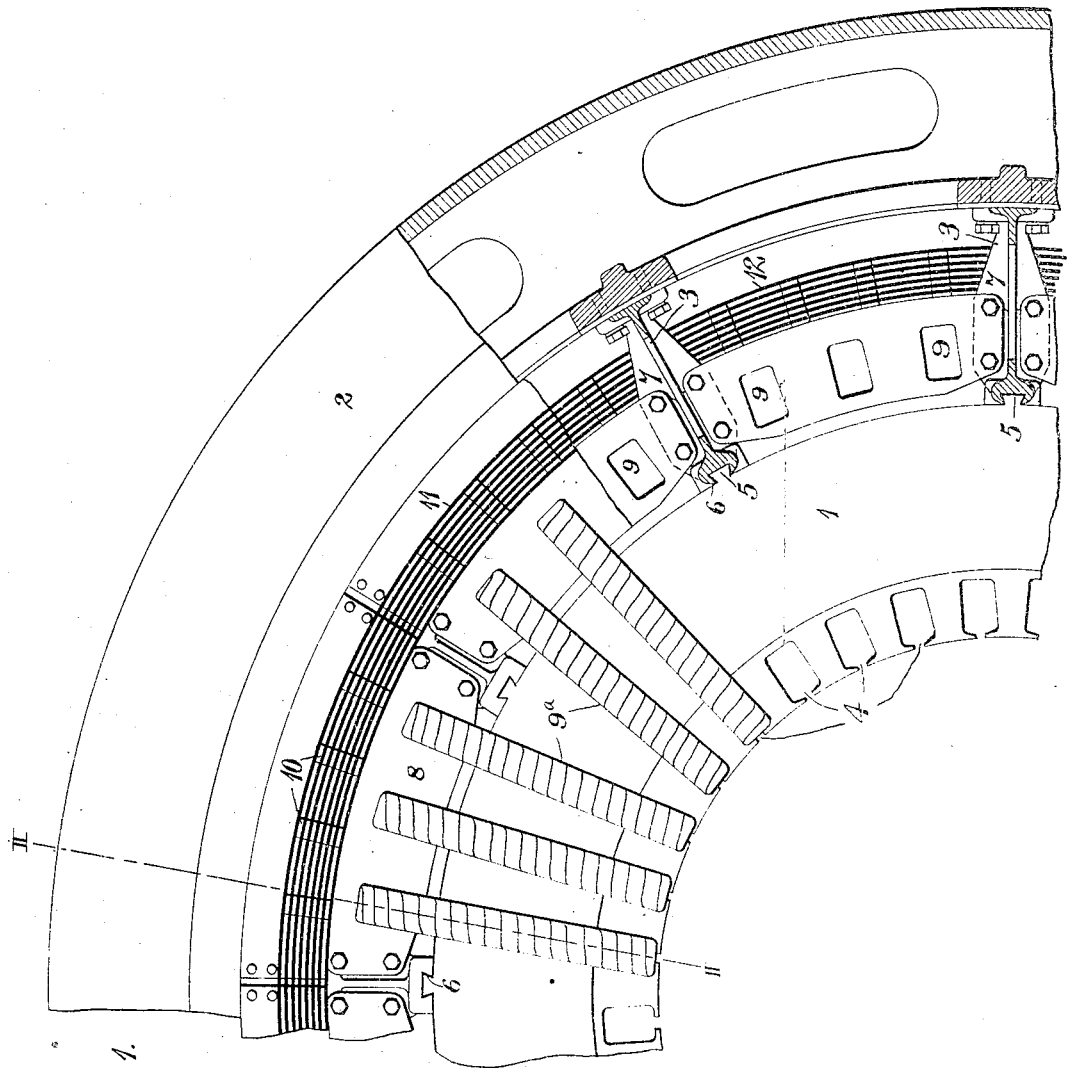

B. G. LAMME.
DYNAMO ELECTRIC MACHINE.
APPLICATION FILED AUG. 2, 1906. RENEWED JULY 3, 1908.

913,017.

Patented Feb. 23, 1909.
2 SHEETS—SHEET 1.

WITNESSES:

INVENTOR

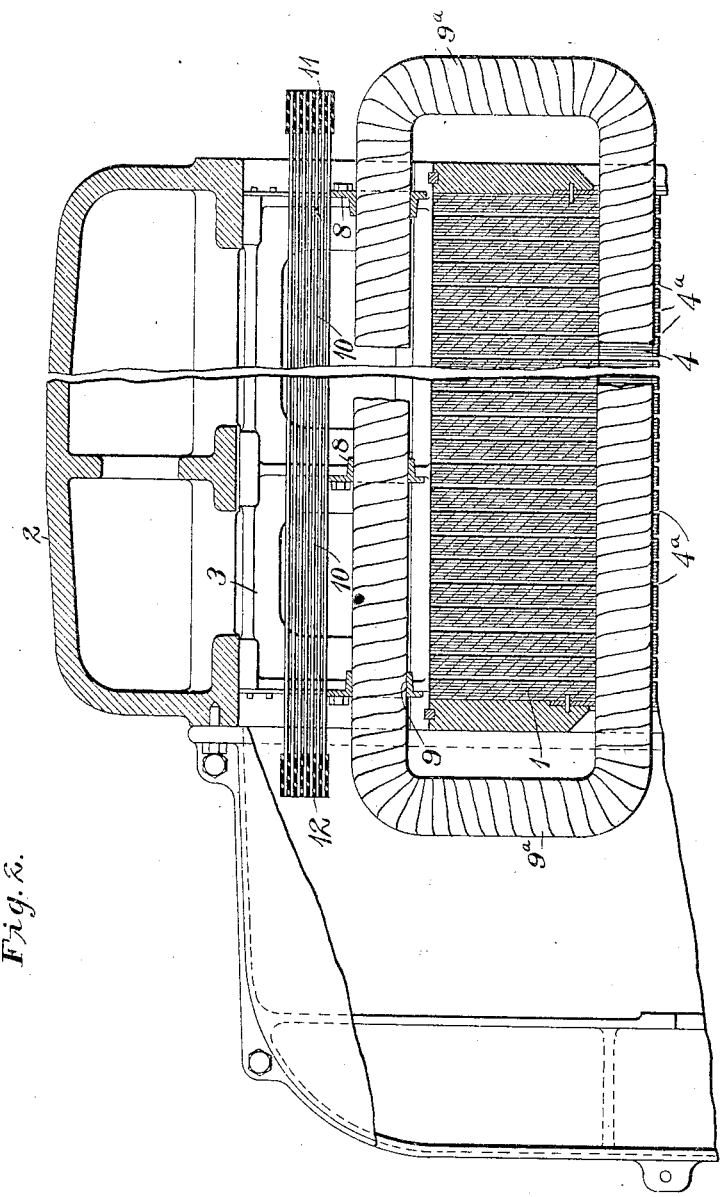

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

No. 913,017.  Specification of Letters Patent.  Patented Feb. 23, 1909.

Application filed August 2, 1906, Serial No. 328,867. Renewed July 3, 1908. Serial No. 441,876.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Dynamo-Electric Machines, of which the following is a specification.

My invention relates to dynamo-electric machines and has special reference to such machines as embody stationary ring wound armatures.

The object of my invention is to avoid the losses incident to the magnetization of the stationary supporting frames for the magnetizable cores of ring wound armatures by providing means for preventing such magnetization.

Alternating current generators which are adapted to be driven by steam turbines or other high speed driving engines generally comprise rotating field members having a small number of poles, usually two or four, and stationary armature members, the windings of which are of the drum type and are located in suitable slots near the inner cylindrical core surfaces. The coils of these windings, by reason of the small number of poles, necessarily comprise long, end-connecting portions, the two parts of a single coil being located in slots which are usually widely separated and, in bipolar machines, are substantially opposite each other. When a machine of this type is completely wound, the portions of the coils not located in the slots are necessarily overlapped by a large proportion of the total number of coils so that it is a very arduous and expensive task, involving considerable length of time, to repair a single inside coil, in case its insulation is punctured or other defects develop. Furthermore, on account of the length and weight of the end connections and also the tendency for the coils to become distorted when the winding becomes short-circuited, or when severe electro-magnetic strains are imposed by external short-circuits or for other reasons, it is necessary to provide adequate supports for these portions of the winding. Difficulty is also experienced in providing suitable ventilation for the end connections of stationary drum-wound armatures since they are massed in order to reduce to a minimum the large amount of space necessarily occupied by this portion of the winding. These difficulties are largely overcome by the use of a stationary ring-wound armature and, in a machine of this type, the supported frame for the laminated armature core may preferably be made of materially larger diameter than the core which it supports and spacing beams of non-magnetizable material may be interposed at frequent intervals between the core and the frame. In this way, a sufficient space is left for the outer half of the armature convolutions but, when the machine is in operation, a relatively strong magnetic field is set up around the outside of the magnetizable core which tends to magnetize the stationary supporting frame and thus produce considerable heat and consequent reduction of efficiency.

According to my present invention, I provide a short-circuited secondary winding which is of relatively low resistance, and is located between the core of the ring winding and the stationary supporting frame for the core structure. This secondary winding may be of any suitable type, but will preferably have a form similar to that of a squirrel-cage induction motor winding.

In the accompanying drawings, Figure 1 is an end elevation of a portion of a stationary armature provided with the winding of my invention, a portion of the frame being broken away to disclose the spacing construction, and Fig. 2 is a sectional elevation on line II—II of Fig. 1.

Referring to the drawings, a cylindrical core member 1 is supported in a frame 2 by means of a plurality of spacing beams 3 which may preferably be constructed of non-magnetizable material. The beams 3 are preferably located in radial planes, equally disposed about the outer cylindrical surface of the core member 1, and are bolted to the frame structure.

The core member 1 is constructed of magnetizable laminae which may be held in place by any convenient means, such as dovetail projections 5, which engage complementary longitudinal grooves or recesses 6 in the inner surfaces of the beams 3 and is provided with suitable slots 4 and ventilating ducts 4ª in the usual manner. Flanged cross pieces 7 are provided at the ends and at intermediate points of the beams 3 to which segmental plates 8 are attached. These segmental plates serve to stiffen the structure and to act also as coil supports, being provided with flanged openings 9, the size of which is commensurate with the core slots 4 and the centers of which lie substantially in radial planes through the center of said slots.

In the ring winding illustrated in the drawings, which comprises coils 9ª, the conductors from any one of the slots 4 extend away from the center, in a radial line, through one set of openings 9, which lie in approximately the same radial plane as the slot, along a substantially radial line toward the center and into the core slot next adjacent to the one from which the opposite end of the coil projects.

Between the outer edges of the segmental plates 8 and the frame 2, a plurality of bars 10 of conducting material are located. The ends of these bars are connected by short-circuiting rings 11 and 12 which complete a short-circuited secondary winding of the squirrel-cage type. The location of a secondary winding in this manner tends to oppose the magnetization in the stationary supporting frame 2 which is produced by the ring wound armature winding of the machine.

Each of the bars 10 is composed of a plurality of strips of relatively thin conducting material, which are slightly separated, and each of the rings 11 and 12 is also composed of a plurality of spaced strips in order to provide for suitable ventilation.

It may be found desirable to make the conductors 10 project for some distance at each end of the core member so that they may be bent to conform to the end curvature of the ring winding for a short distance, and I therefore desire that my invention shall not be restricted in this particular or any other to the exact arrangement illustrated and described.

I claim as my invention:

1. A stationary ring-wound armature for dynamo-electric machines having a short-circuited secondary winding outside of the ring winding.

2. In a dynamo-electric machine, the combination with a stationary ring winding, of a secondary winding outside of the ring winding that comprises a plurality of longitudinally disposed conductors, and short-circuiting end rings therefor.

3. In a dynamo-electric machine, the combination with a stationary cylindrical core member, and a ring winding therefor, of a secondary winding outside of the ring winding that comprises low resistance conductors substantially parallel to the axis of the core and disposed at equal intervals around the periphery of the core and connecting rings at each end.

4. In a dynamo-electric machine, the combination with a hollow cylindrical stationary core member, a supporting frame and a ring armature winding therefor, of a short circuited secondary winding disposed between the ring winding and the supporting frame.

5. In a dynamo-electric machine, the combination with a hollow cylindrical stationary core member, a stationary frame and ring armature therefor, of means for preventing the magnetization of the supporting frame when the ring winding is energized.

6. In a dynamo-electric machine, a magnetizable core member, a supporting frame, and a ring winding therefor, of means for preventing magnetization of the supporting frame.

7. A stationary ring-wound armature for dynamo-electric machines having non-magnetizable supports for the winding, and a short-circuited secondary winding outside of said ring winding.

8. In a dynamo-electric machine, the combination with a stationary ring-wound armature, a supporting frame therefor of materially greater diameter than the armature, a spacing and coil-supporting structure interposed between the stationary frame and the armature, and a short-circuited secondary winding located between the ring winding and the supporting frame.

9. In a dynamo-electric machine, the combination with a stationary ring-wound armature, a supporting frame therefor of materially greater diameter than the armature, a spacing and coil-supporting structure interposed between the stationary frame and the armature, and a short-circuited secondary winding located between the ring winding and the supporting frame that comprises a plurality of longitudinally disposed low resistance conductors and short-circuiting end rings therefor.

10. In a dynamo-electric machine, the combination with a hollow, cylindrical core member, a stationary frame which surrounds said member and is of materially greater diameter, a spacing structure of non-magnetizable material which is interposed between the stationary frame and the core member and comprises beams suitably disposed about the circumference of the core member in radial planes, segmental coil-supporting plates which interconnect said beams, and a short-circuited secondary winding located between the ring winding and the supporting frame.

11. In a dynamo-electric machine, the combination with a hollow, cylindrical core member, a stationary frame which surrounds said member and is of materially greater diameter, a spacing structure of non-magnetizable material which is interposed between the stationary frame and the core member and comprises beams suitably disposed about the circumference of the core member in radial planes, segmental coil-supporting plates which interconnect said beams, and a short-circuited secondary winding located between the ring winding and the supporting frame that comprises a plurality of longitudinally disposed low resistance conductors and short-circuiting end rings therefor.

In testimony whereof, I have hereunto subscribed my name this 28th day of July 1906.

BENJ. G. LAMME.

Witnesses:
OTTO S. SCHAIRER.
BIRNEY HINES.